(12) United States Patent
Xie

(10) Patent No.: US 9,927,270 B2
(45) Date of Patent: Mar. 27, 2018

(54) MULTIPHASE FLOWMETER

(71) Applicant: SCHLUMBERGER TECHNOLOGY CORPORATION, Sugar Land, TX (US)

(72) Inventor: Cheng-Gang Xie, The Azure (SG)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 454 days.

(21) Appl. No.: 14/363,206

(22) PCT Filed: Dec. 6, 2012

(86) PCT No.: PCT/IB2012/057024
§ 371 (c)(1),
(2) Date: Jun. 5, 2014

(87) PCT Pub. No.: WO2013/084183
PCT Pub. Date: Jun. 13, 2013

(65) Prior Publication Data
US 2014/0331783 A1    Nov. 13, 2014

Related U.S. Application Data

(60) Provisional application No. 61/567,220, filed on Dec. 6, 2011.

(51) Int. Cl.
*G01F 1/58* (2006.01)
*G01F 1/36* (2006.01)
(Continued)

(52) U.S. Cl.
CPC ............... *G01F 1/58* (2013.01); *G01F 1/363* (2013.01); *G01F 1/44* (2013.01); *G01F 1/50* (2013.01); *G01F 1/662* (2013.01); *G01F 1/74* (2013.01)

(58) Field of Classification Search
CPC ... G01F 1/363; G01F 1/44; G01F 1/50; G01F 1/58; G01F 1/662; G01F 1/74
(Continued)

(56) References Cited

U.S. PATENT DOCUMENTS 5,485,743 A    1/1996  Taherian et al.
6,532,826 B1 *  3/2003  Dou .......................... G01F 1/74
                                                      73/861.04
(Continued)

FOREIGN PATENT DOCUMENTS

EP    1009975 A1    6/2000
GB    2376074 A     4/2002
(Continued)

OTHER PUBLICATIONS

Fan, Zhaoyan, Virtual Instrument for Online Electrical Capacitance Tomography, published Aug. 2011.*
(Continued)

*Primary Examiner* — Peter Macchiarolo
*Assistant Examiner* — Irving A Campbell

(57) ABSTRACT

Method and apparatus for measuring properties of a flowing multiphase mixture uses a plurality of electrodes or plurality of microwave antennas to rapidly and repeatedly measure an electrical property of the multiphase mixture over a period of time. A computer processes the rapid and repeated measurements to determine a succession of values of permittivity and/or conductivity of a liquid phase of the multiphase mixture within the said period of time and further processes the succession of values of a permittivity and/or a conductivity of the liquid phase to determine at least one of a water-in-liquid-ratio and a liquid holdup of the multiphase mixture. A conduit for the multiphase flow possibly includes a Venturi and the processor takes pressure and differential
(Continued)

pressure as further inputs to compute flow rates for each phase in the multiphase mixture.

22 Claims, 9 Drawing Sheets

(51) Int. Cl.
*G01F 1/44* (2006.01)
*G01F 1/50* (2006.01)
*G01F 1/66* (2006.01)
*G01F 1/74* (2006.01)

(58) Field of Classification Search
USPC .......................................................... 73/61.44
See application file for complete search history.

(56) References Cited

U.S. PATENT DOCUMENTS

| | | | |
|---|---|---|---|
| 6,655,221 | B1 | 12/2003 | Aspelund et al. |
| 6,831,470 | B2 | 12/2004 | Xie et al. |
| 7,469,188 | B2 | 12/2008 | Wee |
| 7,624,652 | B2 | 12/2009 | Wee et al. |
| 7,908,930 | B2 | 3/2011 | Xie et al. |
| 8,027,794 | B2 | 9/2011 | Xie |
| 8,536,883 | B2 | 9/2013 | Xie et al. |
| 8,570,050 | B2 | 10/2013 | Nyfors |
| 2001/0050881 | A1 | 12/2001 | DePaoli et al. |
| 2003/0011386 | A1* | 1/2003 | Xie ............... G01N 33/2823 324/694 |
| 2009/0126502 | A1 | 5/2009 | Wee et al. |
| 2009/0204346 | A1* | 8/2009 | Xie ............... G01F 1/66 702/45 |
| 2010/0206420 | A1 | 8/2010 | Jakobsen |
| 2010/0213953 | A1 | 8/2010 | Yang et al. |
| 2011/0267074 | A1 | 11/2011 | Xie et al. |
| 2011/0290035 | A1 | 12/2011 | Wee et al. |
| 2011/0301877 | A1 | 12/2011 | Wee et al. |
| 2013/0144548 | A1 | 6/2013 | Xie |
| 2014/0307846 | A1* | 10/2014 | Hu ............... G01N 23/046 378/5 |

FOREIGN PATENT DOCUMENTS

| | | | |
|---|---|---|---|
| GB | 2430493 A * | 3/2007 | ............ G01N 22/00 |
| WO | 2008046805 | 4/2008 | |
| WO | 2009030870 | 3/2009 | |
| WO | 2013164303 | 11/2013 | |

OTHER PUBLICATIONS

Xie, C.G., N. Reinecke, M.S. Beck, D. Mewes and R.A. Williams, "Electrical tomographt techniques for process engineering applications", The Chemical Engineering Journal, 56 (1995) 127-133.*

International Search Report of PCT Application No. PCT/IB2012/057024 dated May 15, 2013: pp. 1-4.

Cornelliussen et al., "Handbook of Multiphase Flow Metering," Norwegian Society for Oil and Gas Measurement, Mar. 2005: pp. 1-113.

Cui et al., "Image reconstruction for field-focusing capacitance imaging," Meas. Sci. Technol., 2011, vol. 22: pp. 1-9.

Kjaersgaard-Rasmussen et al., "Inside-out electrical capacitance tomography," Flow Measurement and Instrumentation, 2011, vol. 22: pp. 104-109.

Leeungculsatien et al., "Continuous Phase Velocity Profile Measurement in Multiphase Flow Using a Non-invasive Multi-Electrode Electromagnetic Flow Meter," AIP Conf. Proc., The 7th International Symposium on Measurement TEchniques for Multiphase Flows, Sep. 2011, vol. 1428: pp. 1-8.

Li et al., "Image reconstruction by nonlinear Landweber iteration for complicated distributions," Meas. Sci. Technol., 2008, vol. 19: pp. 1-8.

Qui et al., "Engineering and application of a dual-modality process tomography system," Flow Measurement and Instrumentation, 2007, vol. 18: pp. 247-254.

Xie, "Measurement of Multiphase Flow Water Fraction and Watercut," Multiphase Flow: The Ultimate Measurement Challenge, Proceedings of the 5th International Symposium on Measurement Techniques for Multiphase Flows, Dec. 2006, vol. 914: pp. 232-239.

Xie et al., "Electrical capacitance tomography for flow imaging: system model for development of image reconstruction algorithms and design of primary sensors," IEE Proceedings-G, Feb. 1992, vol. 139(1): pp. 89-98.

Xie et al., "Multiphase Flow Measurement in Oil and Gas Production," 5th World Congress on Industrial Process Tomography, 2007: pp. 1-12.

Yang, "Calibration of capacitance tomography systems: a new method for setting system measurement range," Meas. Sci. TEchnol., 1996, vol. 7: pp. 863-867.

Yang et al., "Development of capacitance tomographic imaging systems for oil pipeline measurements," Rev. Sci. Instrum. Aug. 1995, vol. 66(8): pp. 4326-4332.

Yang, "An Improved Normalisation Approach for Electrical Capacitance Tomography," 1st World Congress on Industrial Process Tomography, Apr. 1999: pp. 215-218.

Anonymous, "The Roxar Multiphase meter 2600 Based on Zector technology," Emerson Process Management Brochure, Feb. 2009, Brochure retrieved Jun. 5, 2014: pp. 1-7.

Extended European Search Report for corresponding EP Application Serial No. 12856370.7, dated May 15, 2015, 8 pages.

European Examination for corresponding EP Application Serial No. 12856370.7, dated Jan. 24, 2018, 9 pages.

Yang, Wuqiang et al., "Multiphase Flow Measurement by Electrical Capacitance Tomography", Imaging Systems and Techniques, IEEE May 17, 2011, pp. 108-111.

* cited by examiner

MULTIPHASE FLOWMETER

CROSS-REFERENCE TO RELATED APPLICATIONS

This application claims priority under 35 U.S.C. § 371 to PCT Application No. PCT/IB2012/057024 filed 6 Dec. 2012, which claims the benefit of U.S. Provisional Patent Application Ser. No. 61/567,220 filed 6 Dec. 2011. The disclosures of both applications above are incorporated herein by reference in their entireties.

BACKGROUND

Measuring individual phase flow rates and other properties of a multiphase flow is challenging because phase distribution and phase velocities in the flow may vary significantly in time and space. A number of technologies have been employed and multiphase flow meters (MPFMs) are commercially available. U.S. Pat. No. 7,908,930 disclosed the use of microwave transmission and receiver antennas for measuring multiphase flow water hold-up and water liquid ratio by measuring the mixture permittivity and/or conductivity at a Venturi throat section together with an (exempt source) gamma ray mixture density measured at the same cross-section as the microwave measurements. However, the use of a gamma ray source is sometimes regarded as undesirable. Tomography using multiple electrodes has also been proposed for measuring multiphase flows, see for example WO2009/030870.

For a multiphase flow composed of gas and liquid with the liquid being a mixture of oil phase and aqueous phase, the properties which may be measured include water in liquid ratio (WLR) which is the volume of aqueous phase in total volume of liquid and in the context of multiphase flow metering it is the ratio between the aqueous phase volume flow rate and the total liquid volume flow rate.

gas volume fraction (GVF) which is the percentage or fraction of gas volume flow rate with respect to total (gas and liquid) volume flow rate.

liquid holdup, also termed liquid fraction, defined as fraction of liquid present in a short interval of pipe (or other flow conduit). It is in effect a relative area of the pipe cross section occupied by the liquid (note that gas holdup=1−liquid holdup). Because each fluid moves at a different speed due to different gravitational forces and other factors, the liquid fraction or liquid holdup is not the same as Liquid Volume Fraction (LVF) which is the proportion of the total volume flow rate due to the liquid (note that LVF=1−GVF).

the volumetric flow rates of the gas, the oil phase and the aqueous phase.

SUMMARY

This summary is provided to introduce a selection of concepts that are further described below. This summary is not intended to be used as an aid in limiting the scope of the subject matter claimed.

In one aspect there is here disclosed a method for measuring properties of a multiphase mixture flowing in a conduit, comprising:

rapidly and repeatedly measuring an electrical property of the multiphase mixture over a period of time;

processing the rapid and repeated measurements to determine a succession of values of a permittivity and/or a conductivity of a liquid phase of the multiphase mixture within the said period of time; and further processing the succession of values of a permittivity and/or a conductivity to determine at least one of a water-in-liquid-ratio and a liquid holdup, i.e. liquid fraction of the multiphase.

Embodiments of the present invention may provide a nuclear-source-free method of measuring WLR and/or the liquid holdup in a multiphase flow. Processing of the measured electrical property to derive permittivity and/or conductivity, and subsequent further processing using the permittivity and/or conductivity values may be carried out by a processor which may be a programmed computer.

Some embodiments of the present invention may be applied to multiphase flow measurements in high-volume low oil-producing wells. In embodiments of the present invention, a MPFM may be used for multiphase mixtures having a relatively wide range of average gas-volume-fraction ("GVF"). Merely by way of example, in some aspects, the GVF may range up to approximately 90%, 95% or even 99%.

Rapid measurements of the electrical property may be repeated with a frequency which makes the measurements almost instantaneous. The time resolution dt may be no more than a few tens of milliseconds. Thus the measurements may be repeated at least 10 times and possibly at least 20 or at least 50 times a second. In some embodiments of the present invention, the instantaneous measurements of the permittivity and/or conductivity of the flow may be carried out repeatedly over a period of time which is long, relative to the time resolution dt. Merely by way of example the instantaneous measurements of the permittivity and/or conductivity may be made rapidly at a time resolution dt over a measurement duration ΔT of the order of tens of seconds, i,e, ten seconds or more and this measurement duration may repeat to capture changes in the flow.

Measurement of an electrical property, which may be capacitance, conductance/resistance or admittance/impedance may be carried out using two or more low-frequency, electrical sensing electrodes configured to operate at up to a few tens of megahertz ("MHz") excitation frequency. Measurement may also be carried out using at least two RF/microwave (or millimeter-wave) antennas, operating at a higher frequency, which may be at least hundreds of megahertz (or higher, such as tens to hundreds of gigahertz). In some embodiments, the low frequency electrical admittance/impedance sensing electrodes and/or the RF/microwave antennas may be disposed at the same cross-section through the flowing mixture and this may be within a throat section of a Venturi. In certain embodiments, the Venturi may be disposed in a generally vertically orientation for measuring upward or downward multiphase flows.

Fast electrical impedance and/or RF/microwave liquid holdup measured at Venturi throat may be used to reconstruct a fast Venturi differential pressure from its low-bandwidth measurement. In an embodiment of the present invention, this configuration reduces the time-averaging error in determining total flow rate due to its nonlinear dependence on the Venturi differential pressure and the mixture density.

The flow in the multiphase mixture may comprise periods of flow when the gas and liquid phases are mixed together and periods of flow when the gas and liquid phases are separated and slugs of the liquid phase flow through the conduit. In one embodiment, the WLR may be determined by using two or more low-frequency, electrical admittance/impedance sensing electrodes and/or two or more dielectric-sensing RF/microwave antennas to make instantaneous measurements of passing liquid slugs with the least amount of entrained gas.

In an embodiment of the present invention, peak values in the instantaneous measurements of permittivity and/or conductivity will correspond to the permittivity and/or conductivity of the liquid phase (a liquid slug) since the permittivity and/or conductivity of a mixture liquid and gas and/or just gas will be lower than the permittivity and/or conductivity of the liquid slug. As such, peak values in the instantaneous measurements made over the measurement duration ΔT yield a moving/rolling estimate (within each ΔT interval) of the liquid permittivity and/or conductivity. The WLR may possibly be determined from the permittivity and/or conductivity of the liquid phase using previous results, a look-up table and/or an appropriate oil-water mixing model.

In an alternative approach, which may be used instead of utilizing peak values in the instantaneous measurements, the repeated measurement of an electrical property of the multiphase mixture is carried out on at least two different measurement paths or different groups of measurement paths where the paths in each group are similar through the flowing mixture. One measurement path or group of paths differs from another in that it extends through more of a central region and less of an edge region of the flowing mixture. Processing of the measurements may then determine a succession of values of permittivity and/or conductivity on each of the different measurement paths or groups of paths and further processing with both successions of values determines at least WLR of the multiphase mixture. Embodiments of this approach make it possible to reduce online calibration requirements of electrical impedance and/or RF/microwave measurement electronics and/or of sensing electrodes/antennas, by performing compensated differential measurement scheme by combining the measurements of two transmitters (or source electrodes) and two receivers (or detection electrodes) that are properly spaced.

WLR is generally more stable in time and in space than the liquid holdup within the ΔT interval, where the ΔT interval is of the order of tens of seconds. In some embodiments of the present invention, a time-averaged (over one ΔT and/or its multiples) liquid holdup can be obtained and then used to derive the GVF through a suitable velocity slip model for gas-liquid flows through a Venturi. This permits the determination of the volumetric flow rates of gas and liquid from the measured Venturi differential pressure, and of those of oil and water from the estimated WLR and the liquid flow rate.

Another aspect of this disclosure provides apparatus for carrying out the method. The apparatus may comprise a conduit for the multiphase flow, at least two sensing electrodes positioned to measure an electrical property along at least one measurement path through the flow in the conduit and/or at least two microwave antennas positioned to direct microwave energy from one to another along at least one measurement path through the flow in the conduit, and processing means to operate the electrodes and/or antennas to make rapid measurements repeatedly over a period of time and to compute from the measurements made. The conduit may extend vertically and may comprise the throat of a Venturi.

In embodiments, the apparatus has one or more sensors for pressure and/or temperature of the multiphase flow, including a differential pressure sensor configured to determine difference in pressure between the throat of a Venturi and pressure in the conduit upstream or downstream of the Venturi.

If sensing electrodes are used, the number of electrodes arranged around the same cross-section through the flow may be more than two, so that measurements can be made along at least two different measurement paths, which may differ in the extent to which the paths pass through central and peripheral regions of the flow. The number of electrodes arranged around the same cross-section maybe at least four or may be a greater number such as at least eight and may provide a system of electrodes with the capability of carrying out a form of electrical tomography of the multiphase flow such as electrical capacitance tomography (ECT), electrical resistance tomography (ERT) or electrical impedance tomography (EIT).

Similarly, if microwave antennas are used, the number of antennas may be more than two so as to allow measurements to be made along at least two different measurement paths through the multiphase flow. The antennas may give a capability to perform microwave tomography of the multiphase flow, such as that disclosed in U.S. Pat. No. 5,485,743.

Inlet to the apparatus may be constructed to promote the formation of liquid rich slugs that are beneficial for online liquid-phase WLR measurement without using a nuclear source, such as by using a blind-tee as input conduit. In some embodiments of the present invention, for high GVF flows, it is possible to arrange the pipe work upstream and/or downstream of a vertical Venturi measurement section, to perform partial gas-liquid separation so that some gas bypasses the multiphase flow meter and is measured separately, creating a liquid-rich stream through the flowmeter with a much reduced GVF such as <~60% for improved WLR determination.

DETAILED DESCRIPTION

Figure 1:
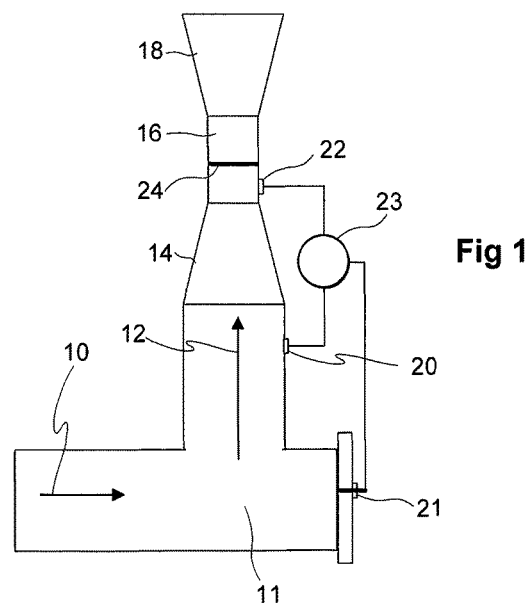
FIG. 1 illustrates a multiphase flowmeter in accordance with an embodiment of the invention.

As shown in FIG. 1, multiphase flow travelling substantially horizontally as indicated by arrow 10 encounters a blind tee 11 and is directed upwardly along a Venturi inlet conduit 12 which leads to the Venturi which has convergent part 14, throat 16 and divergent outlet part 18. This inlet configuration of the pipework with the blind tee 11 may promote a slug-type flow of the multiphase mixture through the Venturi.

A sensor and transmitter 23 capable of measuring pressure, differential pressure and temperature is used with the Venturi. The transmitter 23 can be operated to measure the multiphase mixture differential pressure between a first pressure port 20 located at the Venturi inlet conduit 12 and a second pressure port 22 located at the Venturi throat 16. An absolute pressure measurement of the multiphase mixture may be provided by the transmitter 23 at the first pressure port 20 or the pressure port 22. The multiphase mixture temperature may be measured by a temperature probe 21 located at the blind-tee region and connected to the transmitter 23.

Figure 2:
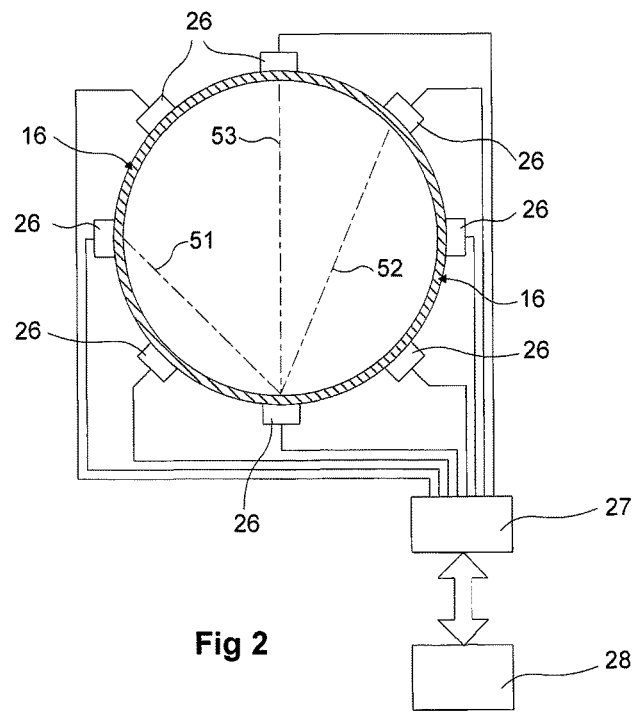
FIG. 2 shows a cross section through the Venturi of the flowmeter of FIG. 1 provided with electrical admittance sensing electrodes.

FIG. 2 shows a cross section on the line 24 transverse to the Venturi flow axis. It is surrounded by a plurality of sensors, which here are electrodes 26, positioned in the plane of the cross section. These electrodes make measurements in a non-contact manner because they are at the exterior of a portion of the Venturi throat 16. This portion of the throat 16 is made from an electrically insulating and non-magnetic material, possibly a ceramic. The electrodes 26 make measurements, through the throat wall, of the multiphase flow within the throat. (However, it is also possible to make measurements in a contact manner, with the electrodes embedded in the insulating material of this portion of the throat wall so as to lie flush with its interior surface and in contact with the multiphase flow). The electrodes 26 are connected to an electronics package 27 for multiplexing among the electrodes to make measurements and the electronics package 27 is in turn connected to a processor such as a computer 28 for controlling excitation of the electrodes, data collection and processing of the data obtained. The computer 28 is also connected to receive input from the transmitter 23.

The electrodes can be operated to measure a property of the multiphase flow which may be capacitance, resistance (or its reciprocal which is conductance), or impedance (or its reciprocal admittance) between individual pairs of electrodes. The electrodes may constitute a system which is capable of performing flow tomography, as an electrical capacitance tomography (ECT), electrical resistance tomography (ERT) or an electrical impedance tomography (EIT) system depending on whether the electrodes are operated to measure capacitance, resistance or impedance. A measurement of flow admittance Y, which is the reciprocal of impedance, made at an angular frequency ω contains terms for both conductance G and capacitance C, as given by an equivalent-circuit formula $$Y = G + j\omega C \text{ where } j^2 = -1$$

and so a measurement of impedance can be used to derive conductance, capacitance or both of these. If the total number of electrodes is N, a total of N(N−1)/2 independent impedance measurements may be obtained by making impedance measurements between each electrode and every other electrode. (The apparatus may if desired be used to perform further measurements in addition to those described here: for example additional non-independent or reciprocal impedance measurements may be made between electrode pairs to perform compensated differential measurements, such as disclosed in US2011/0267074).

As has been disclosed in the literature, the measurements obtained using the electrodes 26 can be processed to obtain multi-view (normalised) capacitance values which do not include the pipe wall capacitances.

As a preliminary, two calibration measurements may be made. Low-calibration raw capacitance measurements $C_l$ (containing N(N−1)/2 independent electrode-pair measurements for an N-electrode system) are made using a material with known low-permittivity ($\in_l$) (such as empty-pipe air or dry gas), followed by high-calibration capacitance measurements $C_h$ using a material of known high-permittivity ($\in_h$) (such as full-pipe oil or an oil-water uniform mixture with a known water-in-liquid ratio WLR).

The effective capacitance of the electrically insulating pipe wall ($C_{wall}$), seen by each pair of the selected electrodes, is considered to be in series with the (unknown) fluid capacitance $C_x$. A ceramic material may be used for the insulating pipe wall to provide a stable value of $C_{wall}$. The measured raw capacitances of the unknown fluid ($C_m$), of the low-permittivity calibration material ($C_l$) and of the high-permittivity calibration material ($C_h$) are then as follows:

$$\frac{1}{C_m} = \frac{1}{C_{wall}} + \frac{1}{C_x(\varepsilon_m)}; \tag{1a}$$

$$\frac{1}{C_l} = \frac{1}{C_{wall}} + \frac{1}{C_x(\varepsilon_l)}; \tag{1b}$$

$$\frac{1}{C_h} = \frac{1}{C_{wall}} + \frac{1}{C_x(\varepsilon_h)}; \tag{1c}$$

The (unknown) fluid only capacitance $C_x$ can be assumed to be proportional to the dielectric constant $\in_m$ of the bulk fluid as follows (where k are proportional/geometrical constants for the different electrode pairs), viz.

$$C_x(\in_m) = k\in_m \tag{2a}$$

$$C_x(\in_l) = k\in_l \tag{2b}$$

$$C_x(\in_h) = k\in_h \tag{2c}$$

To remove the unwanted effects of the pipe-wall capacitances $C_{wall}$, the following raw capacitance normalisation model can be used to derive (measured) normalised capacitances $C_n$ from the measured raw capacitances $C_m$, viz.

$$C_n = \frac{\frac{1}{C_m} - \frac{1}{C_l}}{\frac{1}{C_h} - \frac{1}{C_l}} \tag{3}$$

From Equations (1a) to (1c), and Equations (2a) to (2c), the (measured) normalised capacitances $C_n$ can be related to the ultimately desired (fluid-only) mixture permittivity $\in_m$, as follows:

$$C_n = \frac{\left(\frac{1}{C_{wall}} + \frac{1}{C_x(\varepsilon_m)}\right) - \left(\frac{1}{C_{wall}} + \frac{1}{C_x(\varepsilon_l)}\right)}{\left(\frac{1}{C_{wall}} + \frac{1}{C_x(\varepsilon_h)}\right) - \left(\frac{1}{C_{wall}} + \frac{1}{C_x(\varepsilon_l)}\right)} \tag{4}$$

$$= \frac{\frac{1}{C_x(\varepsilon_m)} - \frac{1}{C_x(\varepsilon_l)}}{\frac{1}{C_x(\varepsilon_h)} - \frac{1}{C_x(\varepsilon_l)}}$$

$$= \frac{\frac{1}{\varepsilon_m} - \frac{1}{\varepsilon_l}}{\frac{1}{\varepsilon_h} - \frac{1}{\varepsilon_l}}$$

Using this approach, the wall-capacitances $C_{wall}$ (and the sensors' geometrical factors k) are substantially removed in the normalized (measured) capacitances $C_n$. Measured multi-view (normalised) capacitances $C_n$ are then converted to a fundamental physics parameter—the corresponding multi-view mixture permittivity $\in_m$. Rearranging Equation (4) provides:

$$\varepsilon_m = \frac{1}{C_n\left(\frac{1}{\varepsilon_h} - \frac{1}{\varepsilon_l}\right) + \frac{1}{\varepsilon_l}} \quad (5)$$

Use of Equation (5) above is a significant step in which the measured multi-view (normalised) capacitances $C_n$ (that are free from the effects of pipe-wall capacitances and the sensors' geometrical factors k) are converted to multi-view mixture permittivities $\in_m$. These flow-dependent-only permittivities $\in_m$ may then be converted to the WLR and/or liquid holdup, as will be explained further below. If desired, it is also possible to use the multi-view $\in_m$ data to construct a direct and/or iterative quantitative tomographic reconstruction of the mixture-permittivity distribution. It can also be seen from Equation (5) that these desired mixture permittivities $\in_m$ are generally a nonlinear function of the normalized capacitances $C_n$.

In some other embodiments of the present disclosure, the electrodes 26 shown in FIG. 2 measure resistance or conductance between electrode pairs at throat 16. (Resistance is of course the reciprocal of conductance).

The measured multi-view (normalised) conductances $G_n$ (that are free from the effects of electrode contact conductances) are converted to multi-view mixture conductivities $\sigma_m$. The mathematical treatment is analogous to that given above for capacitance, as will now be shown.

To perform an appropriate calibration of an electrical conductance measuring system, low-calibration raw conductance measurements $G_l$ may be made by using a material with known low-conductivity ($\sigma_l$) (such as full-pipe fresh water), followed by high-calibration ones $G_h$ by using a material of a known high-conductivity ($\sigma^h$) (such as full-pipe salty water).

The effective contact resistance ($R_{contact}$) of the sensing electrodes can be considered equivalent to being in series with the fluid (unknown) resistance $R_x$ (the electrode material may be chosen so that $R_{contact}$ is small and/or is stable).

The measured raw conductances of the unknown fluid ($G_m$), of the low-conductivity calibration material ($G_l$) and of the high-conductivity calibration material ($G_h$) are then as follows (from $R_m = R_{contact} + R_x$):

$$\frac{1}{G_m} = \frac{1}{G_{contact}} + \frac{1}{G_x(\sigma_m)} \quad (101a)$$

$$\frac{1}{G_l} = \frac{1}{G_{contact}} + \frac{1}{G_x(\sigma_l)} \quad (101b)$$

$$\frac{1}{G_h} = \frac{1}{G_{contact}} + \frac{1}{G_x(\sigma_h)} \quad (101c)$$

The fluid only (unknown) conductance $G_x$ can be assumed to be proportional to the conductivity $\sigma_m$ of the bulk fluid as follows (where k are proportional/geometrical constants for the different electrode pairs), viz.

$$G_x(\sigma_m) = k\sigma_m \quad (102a)$$

$$G_x(\sigma_l) = k\sigma_l \quad (102b)$$

$$G_x(\sigma_h) = k\sigma_h \quad (102c)$$

A normalisation model (analogous to the series-capacitance model at Equation (3) above) can be used to derive the (measured) normalised conductances $G_n$ from the raw conductances $G_m$, viz.

$$G_n = \frac{\frac{1}{G_m} - \frac{1}{G_1}}{\frac{1}{G_h} - \frac{1}{G_1}} \quad (103)$$

From Equations (101a) to (101c), and Equations (102a) to (102c), it is then possible to relate the (measured) normalised conductances $G_n$ to the ultimately desired (fluid-only) mixture conductivity $\sigma_m$, as follows:

$$G_n = \frac{\left(\frac{1}{G_{contact}} + \frac{1}{G_x(\sigma_m)}\right) - \left(\frac{1}{G_{contact}} + \frac{1}{G_x(\sigma_l)}\right)}{\left(\frac{1}{G_{contact}} + \frac{1}{G_x(\sigma_h)}\right) - \left(\frac{1}{G_{contact}} + \frac{1}{G_x(\sigma_l)}\right)} \quad (104)$$

$$= \frac{\frac{1}{G_x(\sigma_m)} - \frac{1}{G_x(\sigma_l)}}{\frac{1}{G_x(\sigma_h)} - \frac{1}{G_x(\sigma_l)}}$$

$$= \frac{\frac{1}{\sigma_m} - \frac{1}{\sigma_l}}{\frac{1}{\sigma_h} - \frac{1}{\sigma_l}}$$

In this way, the electrode contact conductances $G_{contact} = 1/R_{contact}$ and also the sensors' geometrical factors k are substantially removed. However, it can be seen from Equation (104) that the resulting normalized conductances $G_n$ are a nonlinear function of the desired mixture conductivity $\sigma_m$ to be measured and/or to be imaged.

Rearranging Equation (104) gives $$\sigma_m = \frac{1}{G_n\left(\frac{1}{\sigma_h} - \frac{1}{\sigma_l}\right) + \frac{1}{\sigma_l}} \quad (105)$$

By using Equation (105), the normalised conductances $G_n$ are converted to the mixture conductivity $\sigma_m$ which is a fundamental physics parameter which can be used as the input to conductivity mixing model(s) to derive the desired multiphase-flow phase holdup(s) and/or the WLR.

Further embodiments of this disclosure use electrodes 26 to measure electrical impedance which is a somewhat more general approach encompassing both conductance and capacitance measurements. At an appropriate operating frequency, an electrical impedance system can measure the conductances (G) and capacitances (C) of different electrode pairs simultaneously, for example by the use of phase-sensitive (in-phase and quadrature-phase) detection methods. The electrical admittances Y (admittance is the reciprocal of impedance) can be represented by $Y=G+j\omega C$, where $\omega$ is the angular frequency. The fluid mixture complex-conductivity can be expressed $\sigma^*_m=\sigma_m+j\omega\in_o\in_m$ (where $\in_o=8.854$ pF/m). Alternatively, the fluid mixture complex-permittivity can be used, and is expressed $\in^*_m=\in_m+j\sigma_m/(\omega\in_o)$.

Calibration measurements may again be required. The measured raw admittances of the unknown fluid ($Y_m$), of the low complex-conductivity calibration material ($Y_l$), and of the high complex-conductivity calibration material ($Y_h$), are then as follows (from $1/Y_m=1/Y_{contact}+1/Y_x$):

$$\frac{1}{Y_m} = \frac{1}{Y_{contact}} + \frac{1}{Y_x(\sigma^*_m)} \quad (201a)$$

$$\frac{1}{Y_l} = \frac{1}{Y_{contact}} + \frac{1}{Y_x(\sigma^*_l)} \quad (201b)$$

$$\frac{1}{Y_h} = \frac{1}{Y_{contact}} + \frac{1}{Y_x(\sigma^*_h)} \quad (201c)$$

The fluid only (unknown) admittances $Y_x$ can be assumed to be proportional to the complex-conductivity $\sigma^*_m$ of the bulk fluid as follows (where k are proportional/geometrical constants for the different electrode pairs), viz.

$$Y_x(\sigma^*_m)=G_x(\sigma_m)+j\omega\in_o C_x(\in_m)=k\sigma_m+j\omega\in_o k\in_m=k\sigma^*_m \quad (202a)$$

$$Y_x(\sigma^*_l)=G_x(\sigma_l)+j\omega\in_o C_x(\in_l)=k\sigma_l+j\omega\in_o k\in_l=k\sigma^*_l \quad (202b)$$

$$Y_x(\sigma^*_h)=G_x(\sigma_h)+j\omega\in_o C_x(\in_h)=k\sigma_h+j\omega\in_o k\in_h=k\sigma^*_h \quad (202c)$$

The normalised admittances $Y_n$ (from the raw admittances $Y_m$) are derived similarly to the normalised capacitances (Equation 3) or normalised conductances (Equation 103), as follows:

$$Y_n = \frac{\frac{1}{Y_m} - \frac{1}{Y_1}}{\frac{1}{Y_h} - \frac{1}{Y_1}} \quad (203)$$

From Equations (201a) to (201c), and Equations (202a) to (202c), the (measured) normalised admittances $Y_n$ can then be related to the ultimately desired (fluid-only) mixture complex conductivity $\sigma^*_m$, as follows:

$$Y_n = \frac{\left(\frac{1}{Y_{contact}} + \frac{1}{Y_x(\sigma^*_m)}\right) - \left(\frac{1}{Y_{contact}} + \frac{1}{Y_x(\sigma^*_l)}\right)}{\left(\frac{1}{Y_{contact}} + \frac{1}{Y_x(\sigma^*_h)}\right) - \left(\frac{1}{Y_{contact}} + \frac{1}{Y_x(\sigma^*_l)}\right)} \quad (204)$$

$$= \frac{\frac{1}{Y_x(\sigma^*_m)} - \frac{1}{Y_x(\sigma^*_l)}}{\frac{1}{Y_x(\sigma^*_h)} - \frac{1}{Y_x(\sigma^*_l)}}$$

$$= \frac{\frac{1}{\sigma^*_m} - \frac{1}{\sigma^*_l}}{\frac{1}{\sigma^*_h} - \frac{1}{\sigma^*_l}}$$

In this way, the electrode contact/wall impedances $Z_{contact}=1/Y_{contact}$ (and the sensors' geometrical factors k) are substantially removed in the normalised (measured) admittances $Y_n$, but the resulting normalized admittances $Y_n$ are a nonlinear function of the desired mixture-complex conductivity $\sigma^*_m$ to be measured and/or to be imaged.

Rearranging Equation (204) gives:

$$\sigma^*_m = \frac{1}{Y_n\left(\frac{1}{\sigma^*_h} - \frac{1}{\sigma^*_l}\right) + \frac{1}{\sigma^*_l}} \quad (205)$$

Thus the normalised admittances $Y_n$ are converted, by use of Equation (205), to a fundamental physics parameter which is the mixture complex-conductivity $\sigma^*_m$.

In the embodiment illustrated by FIG. 2 there are eight electrodes 26 providing a system for measuring capacitances (and which would be capable of operation as an ECT tomography system, if so desired). This system was used to make measurements on multiphase vertical flows at the throat section of a 52 mm Venturi with known values of WLR=~1%, ~10%, ~20%, ~30% and ~40% and known values of gas-volume-fraction (GVF) up to 93%. The eight electrodes were used to measure the capacitances between every electrode pair although the measurements between immediately adjacent electrodes were not used because of the amount of pipe wall in the path between such electrodes. These measurements were made rapidly at an approximate frame rate of 100 frames-per-second.

Figure 3:
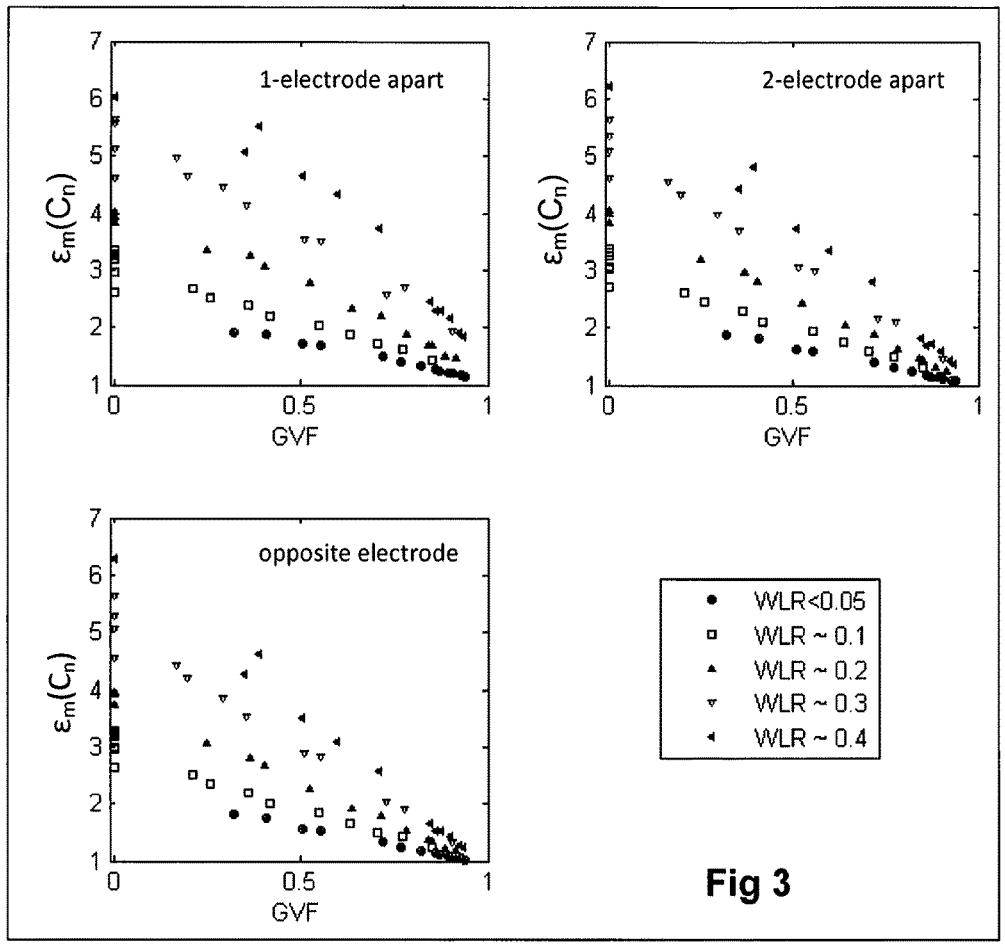
FIG. 3 shows time averaged permittivity determined using the electrodes of FIG. 2 plotted against GVF.

FIG. 3 shows time-averaged (~60 s) mixture permittivity $\in_m$ calculated from three groups of normalized capacitance $C_n$ measurements which were:

measurements between the eight electrodes spaced one apart (ie 1-3, 2-4 etc with one in between as exemplified by path 51 in FIG. 2), measurements between the eight electrodes two apart (ie 1-4, 2-5 etc with two in between as exemplified by path 52 in FIG. 2) and measurements between the four diametrically opposite electrodes (1-5, 2-6 etc as exemplified by path 53 in FIG. 2).

These time-averaged multi-view $\in_m$ measurements are shown in FIG. 3 as three graphs from which it can be seen that (at the same WLR and GVF) the differences in $\in_m$ among the three views are small. Thus these time-averaged measurements across different parts of the throat cross-section may not offer enough information for reliable determination of the desired multiphase-flow properties such as time-averaged gas/liquid holdups and the WLR. On their own, these time-averaged measurements do not offer a way to distinguish all the phases.

Figure 4:
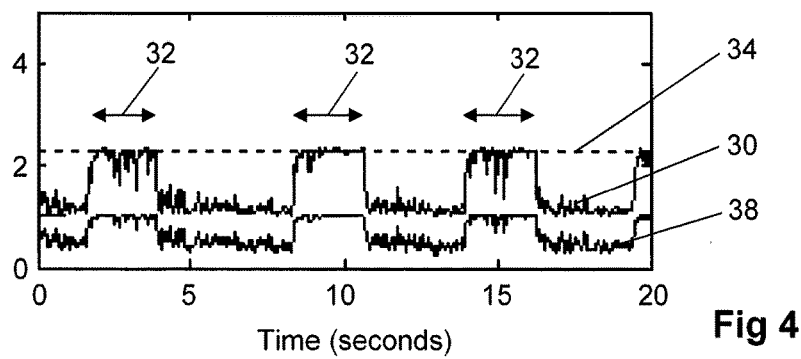
FIG. 4 shows an example of instantaneous mixture permittivity across the Venturi throat section of FIG. 2, together with derived liquid holdup, plotted against time.

FIG. 4 provides an example of plotting instantaneous measurements of $\in_m$ on the vertical axis against time along the horizontal axis. In this illustrative example the multiphase flow was at WLR ~1% and GVF ~55%. The trace 30 is the permittivity $\in_m$ calculated from measurements between opposite electrodes, and this trace includes periods 32 when $\in_m$ reached the horizontal dashed line 34 which is the expected permittivity for the liquid phase. These periods 32 corresponded to liquid-rich slugs passing through the measurement cross section 24 at the Venturi throat 16. A trace for the permittivity between electrodes two apart showed similar behavior but has been omitted from the figure for clarity. Plots for flows with the same WLR and various values of GVF up to GVF~90% showed similar behaviour to that illustrated by FIG. 4. The trace 38 is the instantaneous liquid holdup calculated from the instantaneous mixture-permittivity trace 30; this will be described below (Equation 8a).

The WLR of the liquid phases is more constant in time and in space than the liquid fraction (liquid holdup). As illustrated by the observation in FIG. 4, it can be estimated by detecting and measuring the instantaneous signals related to the mixture permittivity $\in_m(t)$ (and/or to the conductivity $\sigma_m(t)$ for electrical conductance sensing) as liquid slugs with the least amount of entrained gas pass through the sensing electrodes' cross section during a relatively long duration (say over $\Delta T=\sim 20$ s). This liquid-slug tracking process thus yields a rolling estimate (within each $\Delta T$ interval) of a (short) time-averaged liquid permittivity $\in_{liquid}(\Delta T)$ (and/or conductivity $\sigma_{liquid}(\Delta T)$), e.g. by using the following (peak-value-median-averaging) formulae:

$$\hat{\in}_{liquid}(\Delta T) = \langle \in_m(t) \geq 0.95 \times \max(\in_m(t\epsilon\Delta T)) \rangle \text{ oil/water-continuous} \quad (6a)$$

$$\hat{\sigma}_{liquid}(\Delta T) = \langle \sigma_m(t) \geq 0.95 \times \max(\sigma_m(t\epsilon\Delta T)) \rangle \text{ water-continuous} \quad (6b)$$

The liquid-phase WLR may be estimated based on an appropriate oil-water mixing model, such as the Ramu-Rao's oil-water mixing model. Appropriate equations for estimating gas-liquid flow WLR and liquid holdup ($\alpha_{liquid}$) from the measured instantaneous (a) mixture permittivity $\in_m(t)$ when liquid is oil continuous or water continuous and (b) mixture conductivity $\sigma_m(t)$ when the liquid is water continuous are:

$$WLR(\Delta T) = \frac{\hat{\varepsilon}_{liquid}(\Delta T) - \varepsilon_{oil}}{\hat{\varepsilon}_{liquid}(\Delta T) + 2\varepsilon_{oil}} \quad (7a)$$

oil-continuous $$WLR(\Delta T) = \frac{3\hat{\varepsilon}_{liquid}(\Delta T)}{\hat{\varepsilon}_{liquid}(\Delta T) + 2\varepsilon_{water}} \quad (7b)$$

water-continuous $$WLR(\Delta T) = \frac{3\hat{\sigma}_{liquid}(\Delta T)}{\hat{\sigma}_{liquid}(\Delta T) + 2\sigma_{water}} \quad (7c)$$

water-continuous

Instantaneous liquid holdup $\alpha_{liquid}(t)$ may be obtained from the estimated liquid-phase permittivity $\in_{liquid}(\Delta T)$ and/or conductivity $\sigma_{liquid}(\Delta T)$ which can be considered as substantially stable within the related $\Delta T$ interval and from the measured instantaneous gas-liquid mixture permittivity $\in_m(t)$ and/or conductivity $\sigma_m(t)$, based on the use of a gas-liquid mixing model, viz.

$$\alpha_{liquid}(t) = \left(\frac{\varepsilon_m(t) - \varepsilon_{gas}}{\hat{\varepsilon}_{liquid}(\Delta T) - \varepsilon_{gas}}\right)^{\frac{1}{x}} \quad (8a)$$

oil continuous or
water-continuous $$\alpha_{liquid}(t) = \left(\frac{\sigma_m(t)}{\hat{\sigma}_{liquid}(\Delta T)}\right)^{\frac{1}{y}} \quad (8b)$$

water-continuous and a time-averaged value of the liquid holdup for the period $\Delta T$ can be obtained from the instantaneous values, thus $$\hat{\alpha}_{liquid}(\Delta T) = \langle \alpha_{liquid}(t\epsilon\Delta T) \rangle \quad (8c)$$

where x and y are empirical parameters provided by modelling and/or experiments with the mixture of gas and liquid.

We have used a mixing model in which a gas core is presumed to flow within annulus of liquid and this model provides values of x and y of approximately 3 for measurements between opposite electrodes and x and y of approximately 2 for measurements between electrodes two apart over a wide range of vertical upward gas-liquid flows (including flows with GVF=0).

Figure 5:
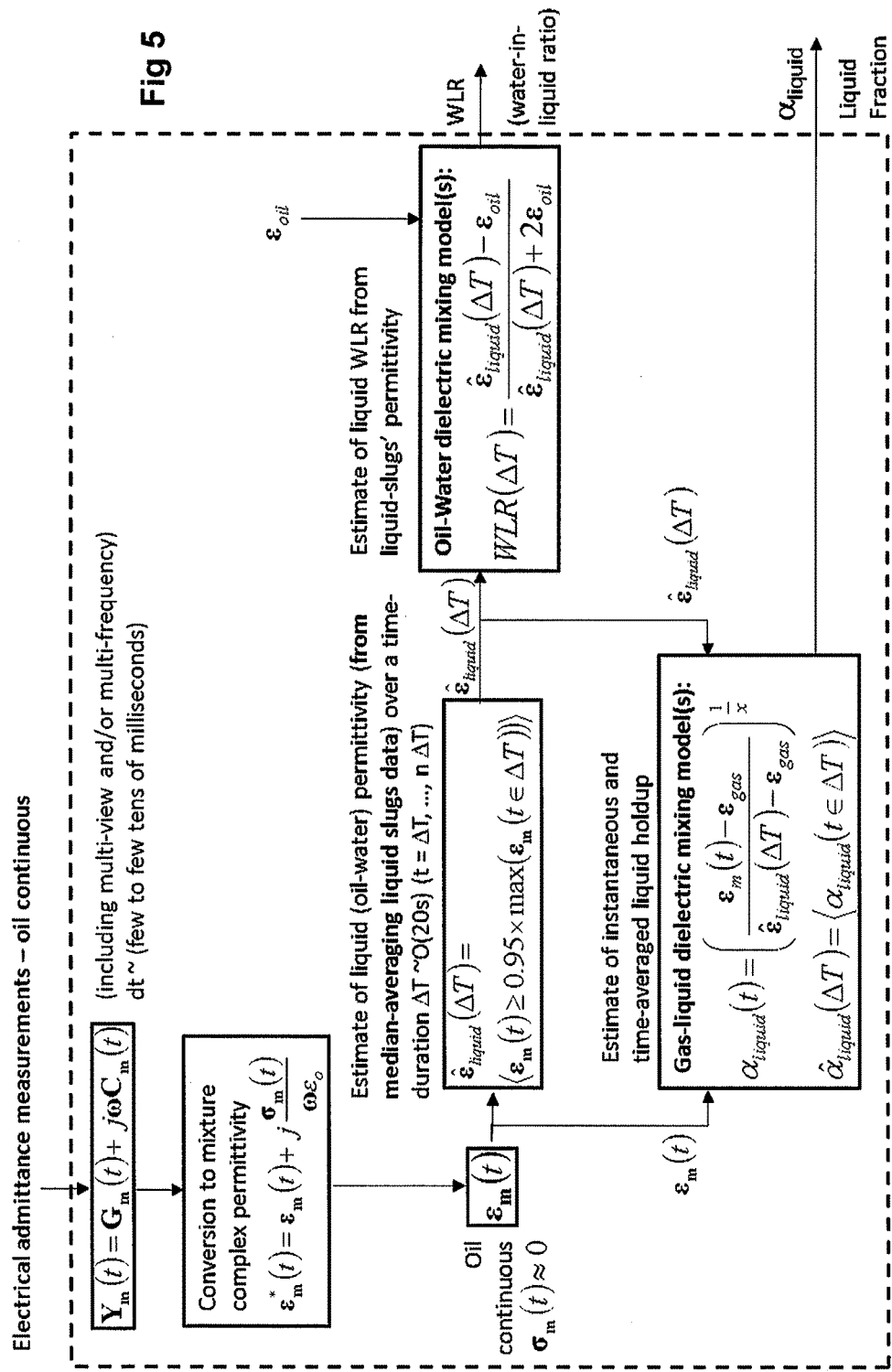
FIGS. 5 and 6 are flow charts showing example schemes of data processing for electrical admittance sensing methods.
Figure 6:
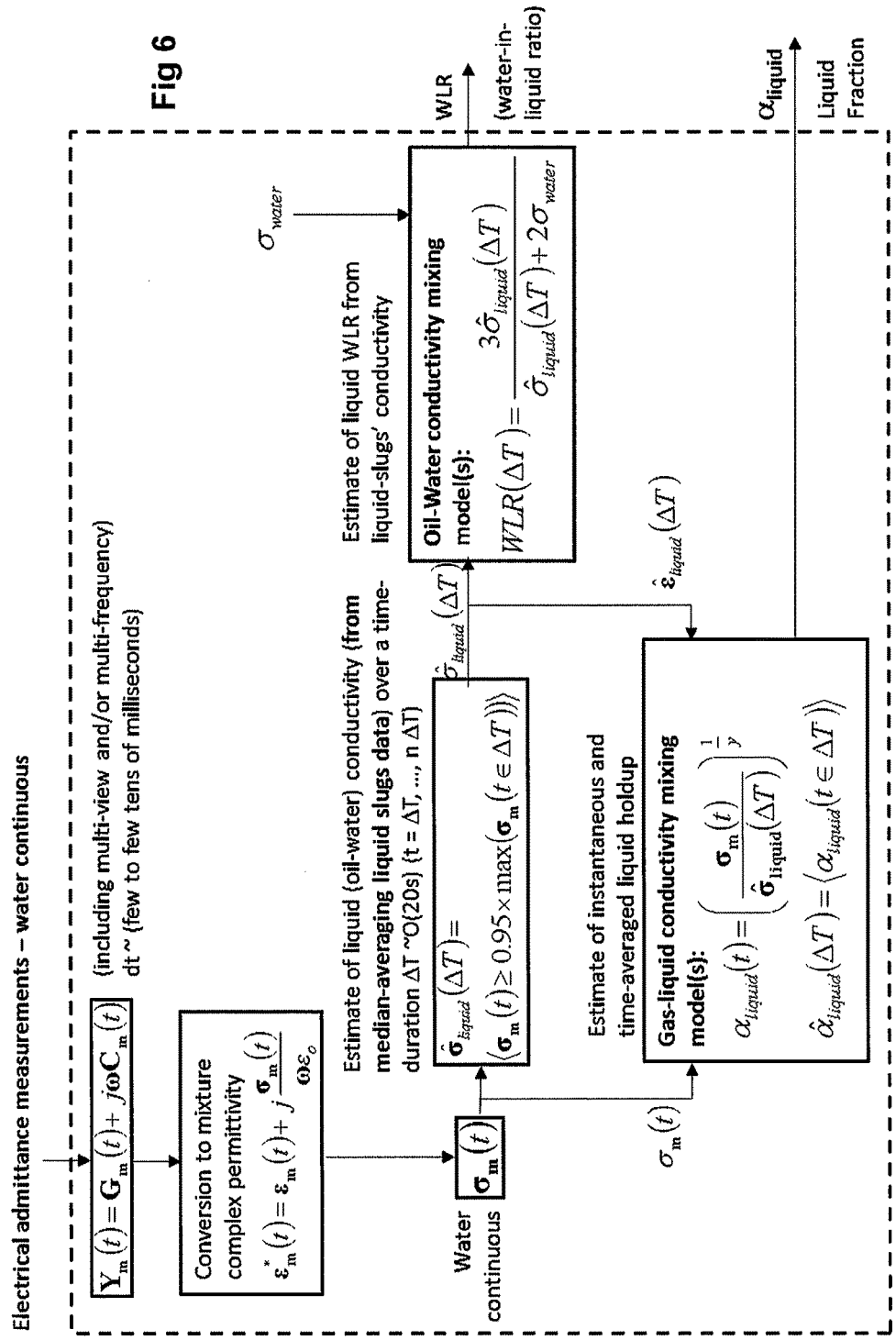

FIGS. 5 and 6 are flow charts which illustrate the above procedures for processing data from electrical admittance/impedance sensors. These figures relate to multiphase flows in which liquid phases are oil-continuous and water-continuous respectively (mixture conductivity measurement is illustrated for the water-continuous case in FIG. 6 but note that mixture permittivity measurement may also be used for some water-continuous cases). The measurements referred to above were used to give estimates of WLR averaged over 60 seconds. It was found that these estimates of WLR were accurate to within ±5% absolute for GVF up to 92% for near cross-pipe (2-electrode apart) and diametrical cross-pipe (opposite electrode-pair) measurements.

Figure 7:
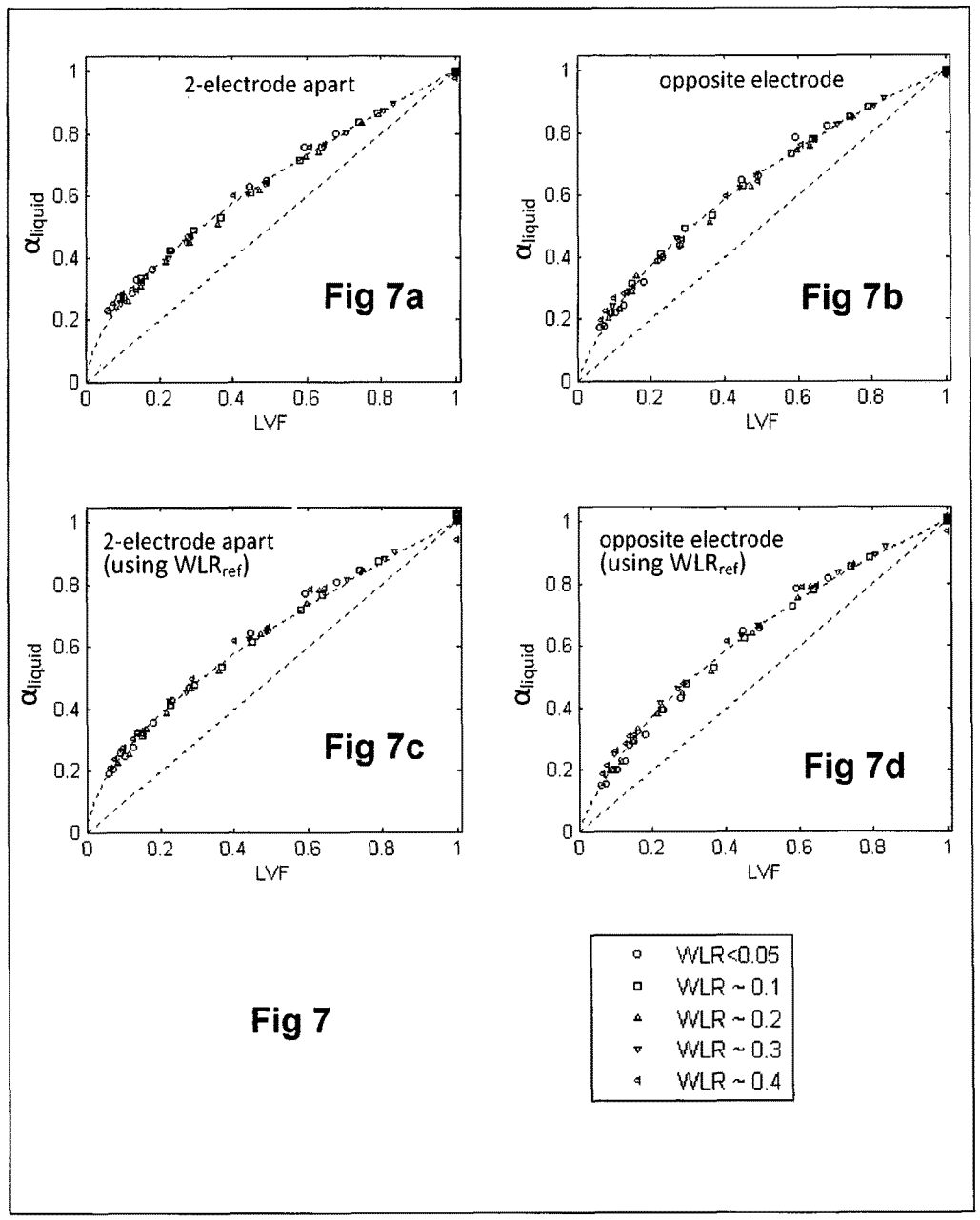
FIG. 7 is four graphs of measured values of liquid holdup plotted against known values of liquid volume fraction.

FIGS. 7a and 7b show graphs of liquid fraction (ie liquid holdup) as determined using Equations (8a) and (8c) against known LVF values (liquid volume fraction also termed liquid cut, and is related to the known GVF values by LVF=1−GVF).

It can be seen that the liquid holdup determined using Equations (8a) and (8c) have a good correlation with the known LVF values. FIGS. 7c and 7d were plotted as a check, showing the liquid holdup derived from the liquid permittivity calculated from the known reference WLR. These are also a good correlation with the known LVF values.

Figure 8:
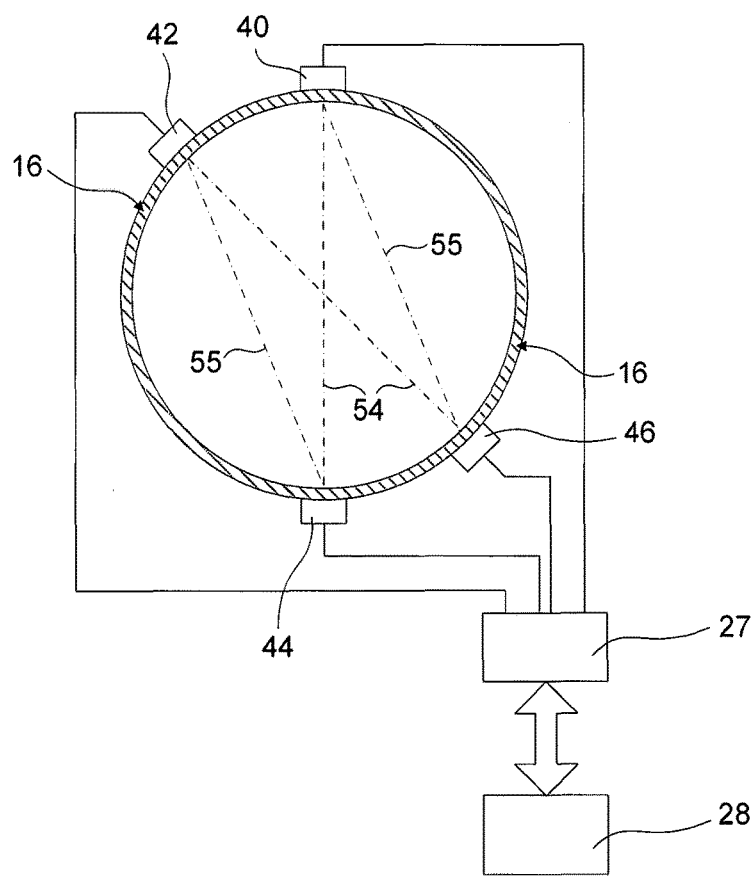
FIG. 8 shows a cross section through the Venturi of the flowmeter of FIG. 1 provided with microwave transmitters and receivers.

FIG. 8 shows a cross-section on line 24 transverse to the axis of the Venturi of FIG. 1 when two microwave transmitters 40, 42 and two microwave receivers 44, 46 are positioned at the exterior of the Venturi throat 16. Diametrical cross pipe transmissions along paths 54 can be made from transmitter 40 to receiver 44 and likewise from 42 to 46. Transmissions which pass nearer to the pipe wall can be made along paths 55 from transmitter 42 to receiver 44 and likewise from 40 to 46. This layout has general similarity to that shown in US 2011/0267074.

As described in, for example U.S. Pat. No. 7,908,930, values of mixture permittivity $\in_m$ and conductivity $\sigma_m$ can be obtained from measurements of amplitude attenuation and phase shift between a microwave transmitter and microwave receiver. Using this arrangement of microwave transmitters and receivers shown in FIG. 8 cross pipe measurements were made at 800 MHz on gas-liquid vertical flows with known values of WLR and known values of GVF just as was done with the embodiment of FIG. 2. Measurements were made rapidly and repeatedly at a rate of approximately 1000 frames per second.

Figure 9:
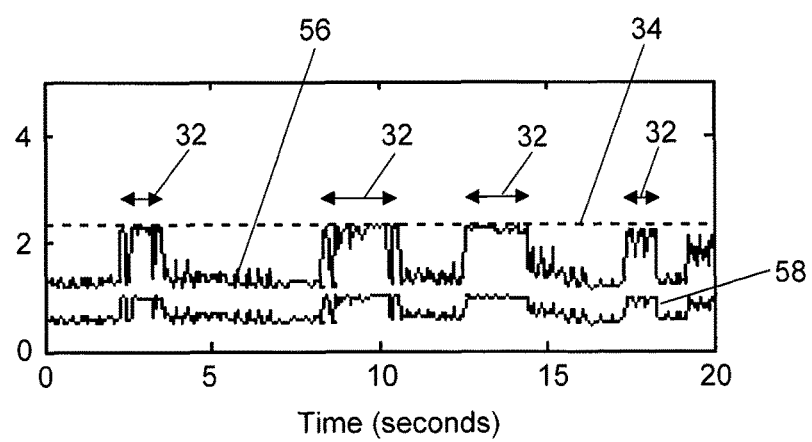
FIG. 9 shows an example of instantaneous mixture permittivity across the Venturi throat section of FIG. 8, together with derived liquid holdup, plotted against time.

FIG. 9 shows measurements of $\in_m$ as a plot against time on the horizontal axis. This plot is directly analogous to that in FIG. 4 and has a similar appearance with periods 32 when a liquid slug passed through the measurement cross-section and $\in_m$ reached the expected permittivity for the liquid phase indicated by dotted line 34. In this plot the instantaneous mixture permittivity for diametrical cross pipe measurements on measurement paths 54 is indicated as trace 56. Permittivity calculated from measurements on paths 55 from transmitter 42 to receiver 44 and likewise from 40 to 46 showed similar behaviour but has been omitted for clarity.

The trace 58 is the instantaneous liquid holdup calculated from the instantaneous mixture-permittivity trace 56 (from Equation (8a)).

Figure 10:
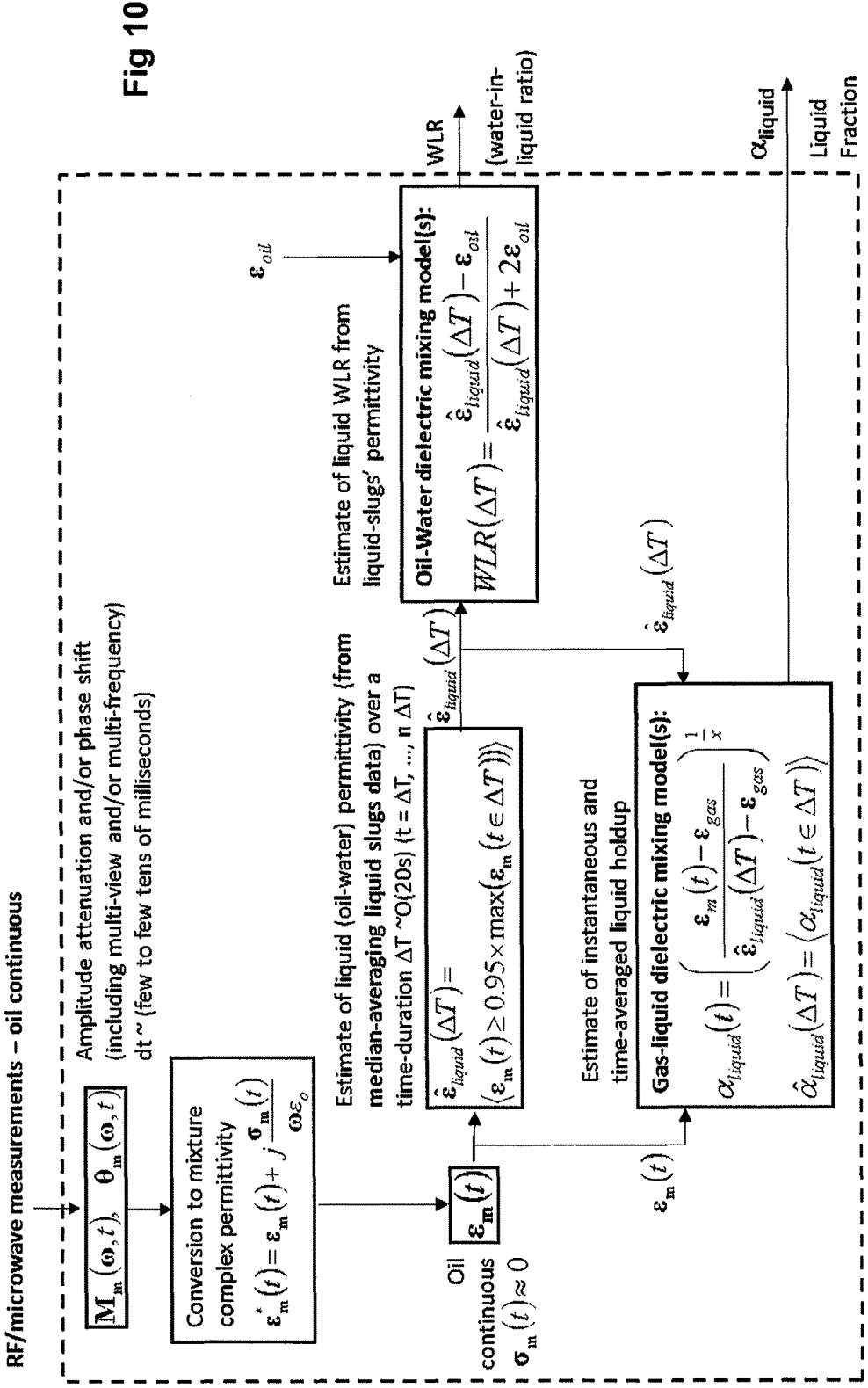
FIGS. 10 and 11 are flow charts showing example schemes of data processing for RF/microwave sensing methods.

The permittivity values $\varepsilon_m$ can be processed to provide values of WLR and liquid holdup in similar manner to the processing of data from electrodes 26 of FIG. 2. Flowcharts of the processing steps are given as FIGS. 10 and 11.

Values of WLR estimated from analyzing the instantaneous mixture-permittivity time-series $\varepsilon_m(t)$ measured by microwave cross-pipe transmission as just discussed were compared with the known values of WLR of the mixtures which were measured. For oil-continuous flows (WLR<~60%), it was observed that the WLR values were within ±5% absolute for GVF up to about 90%.

Figure 11:
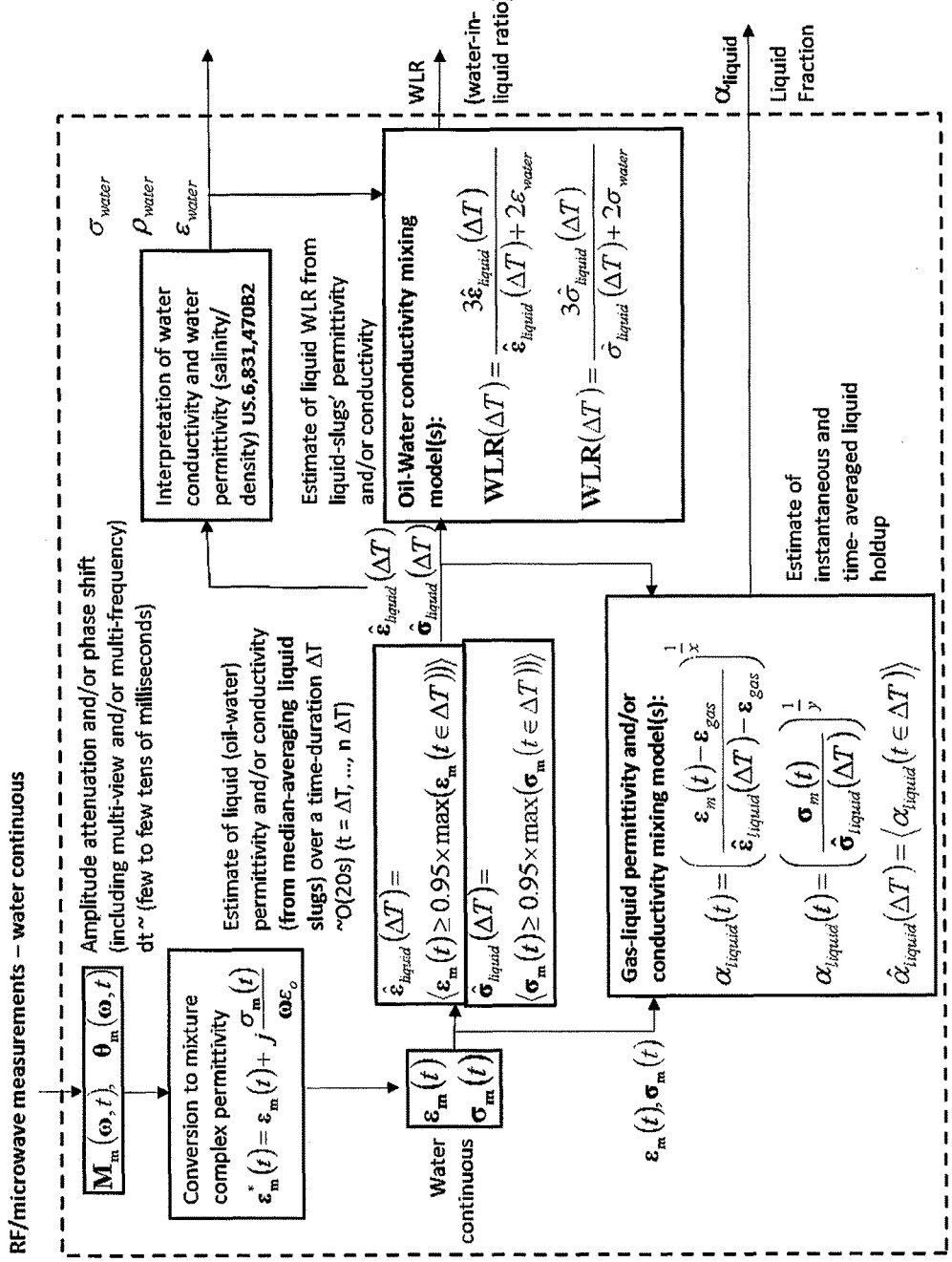

As mentioned in FIG. 11 it is additionally possible to derive the underlying water conductivity $\sigma_{water}$ and consequently the water salinity, permittivity and/or density under multiphase flowing conditions by interpreting the measured permittivity $\varepsilon_{liquid}(\Delta T)$ and conductivity $\sigma_{liquid}(\Delta T)$ of a liquid-rich slug as in U.S. Pat. No. 6,831,470.

In another approach to processing the measured data the liquid holdup and/or the WLR are derived from the mixture-permittivity data of different groups of electrode pairs (or different groups of microwave measurements), using Equation 8(a) and inserting empirical values for x as mentioned above. Using x=2 and permittivity $\varepsilon_{m,e2}$, from measurements between electrodes two apart (or from microwave transmitters 40, 42 to receivers 46, 44 respectively) and using x=3 and permittivity $\varepsilon_{m,e3}$, from diametrical measurements between opposite electrodes, (or from microwave transmitters 40, 42 to receivers 44, 46 respectively) Equation 8(a) becomes $$\alpha_{liquid}^2 = \frac{\varepsilon_{m,e2} - \varepsilon_{gas}}{\varepsilon_{liquid} - \varepsilon_{gas}} \quad (9a)$$

$$\alpha_{liquid}^3 = \frac{\varepsilon_{m,e3} - \varepsilon_{gas}}{\varepsilon_{liquid} - \varepsilon_{gas}} \quad (9b)$$

Taking their ratio leads to an estimate of the liquid holdup $$\alpha_{liquid} = \frac{\varepsilon_{m,e3} - \varepsilon_{gas}}{\varepsilon_{m,e2} - \varepsilon_{gas}} \quad (9c)$$

Substituting Equation (9c) into e.g. Equation (9a) leads to the liquid-phase permittivity:

$$\varepsilon_{liquid} = \frac{\varepsilon_{m,e2} - \varepsilon_{gas}}{\alpha_{liquid}^2} + \varepsilon_{gas} = \frac{(\varepsilon_{m,e2} - \varepsilon_{gas})^3}{(\varepsilon_{m,e3} - \varepsilon_{gas})^2} + \varepsilon_{gas} \quad (9d)$$

It is then possible to use Equation (7a) to derive the WLR for oil-continuous gas-liquid flows (or Equation (7b) may be used to derive the WLR for water-continuous gas-liquid flows). The ratio-metric nature of Equation (9c) and Equation (9d) leads to the potential of a reduced-calibration sensing system for liquid holdup and liquid permittivity (WLR) determinations, because, for example, any drift effects of the sensing electronics 27 in FIG. 2 may be removed. The liquid permittivity and liquid holdup may be derived without relying on detecting the largely gas-free liquid slugs and processing measurements associated with them.

If the multiphase flow is a water continuous flow, equations similar to 9(a) to 9(d) above can be used for mixture conductivity ($\sigma_m$), thus:

$$\alpha_{liquid}^2 = \frac{\sigma_{m,e2}}{\sigma_{liquid}} \quad (10a)$$

$$\alpha_{liquid}^3 = \frac{\sigma_{m,e3}}{\sigma_{liquid}} \quad (10b)$$

$$\alpha_{liquid} = \frac{\sigma_{m,e3}}{\sigma_{m,e2}} \quad (10c)$$

$$\sigma_{liquid} = \frac{\sigma_{m,e2}^3}{\sigma_{m,e3}^2} \quad (10d)$$

In such embodiments, Equation (7c) may be used to determine the WLR of the multiphase mixture from a measured $\sigma_{liquid}$ from Equation (10d) for water-continuous gas-liquid flows. In such embodiments, the ratio-metric nature of Equations (10c) and (10d) once again means that a multiphase meter may be an essentially calibration free measurement system for liquid holdup and conductivity (WLR) determinations.

Further information about the multiphase flow may be obtained by combining determinations of WLR and liquid holdup by derivation from electrical impedance and/or microwave measurements as discussed above with the Venturi differential-pressure (and line pressure and temperature). It is then possible to derive individual oil, water and gas phase flow rates. A flow chart showing the data processing steps onward from those in any of FIG. 5, 6, 10 or 11 is provided in FIG. 12.

The liquid holdup determined from measurements as above can be used to provide an estimate of GVF by referring to correlations such as shown in FIGS. 7a and 7b. The liquid WLR and liquid holdup (or the GVF) determined from measurements as above permits the estimate of the liquid density $\rho_{liquid}$ and the gas-liquid mixture density $\rho_{mixture}$ without using a nuclear source (with known water, oil and gas densities $\rho_{water}$, $\rho_{oil}$, and $\rho_{gas}$ from the measured line pressure and temperature, and the fluids' pressure-volume-temperature PVT properties). The gas-liquid ratio (GLR) can be derived from the GVF estimate. As is well-known (referred to in U.S. Pat. No. 7,908,930 for instance) the differential pressure measurement at the Venturi ($\Delta P_{venturi}$) enables a total mass flow rate ($Q_{total}$) be determined, with the above-estimated gas-liquid mixture density $\rho_{liquid}$ as the input. Combining this determination of the total mass flow rate with determinations of the GLR, the liquid density $\rho_{liquid}$ (gas density is known) and the WLR obtained from measurements as above, as shown by the flowchart of FIG. 12, leads to the calculation of gas, water and oil flow volumetric rates $q_{gas}$, $q_{water}$ and $q_{oil}$.

Figure 12:
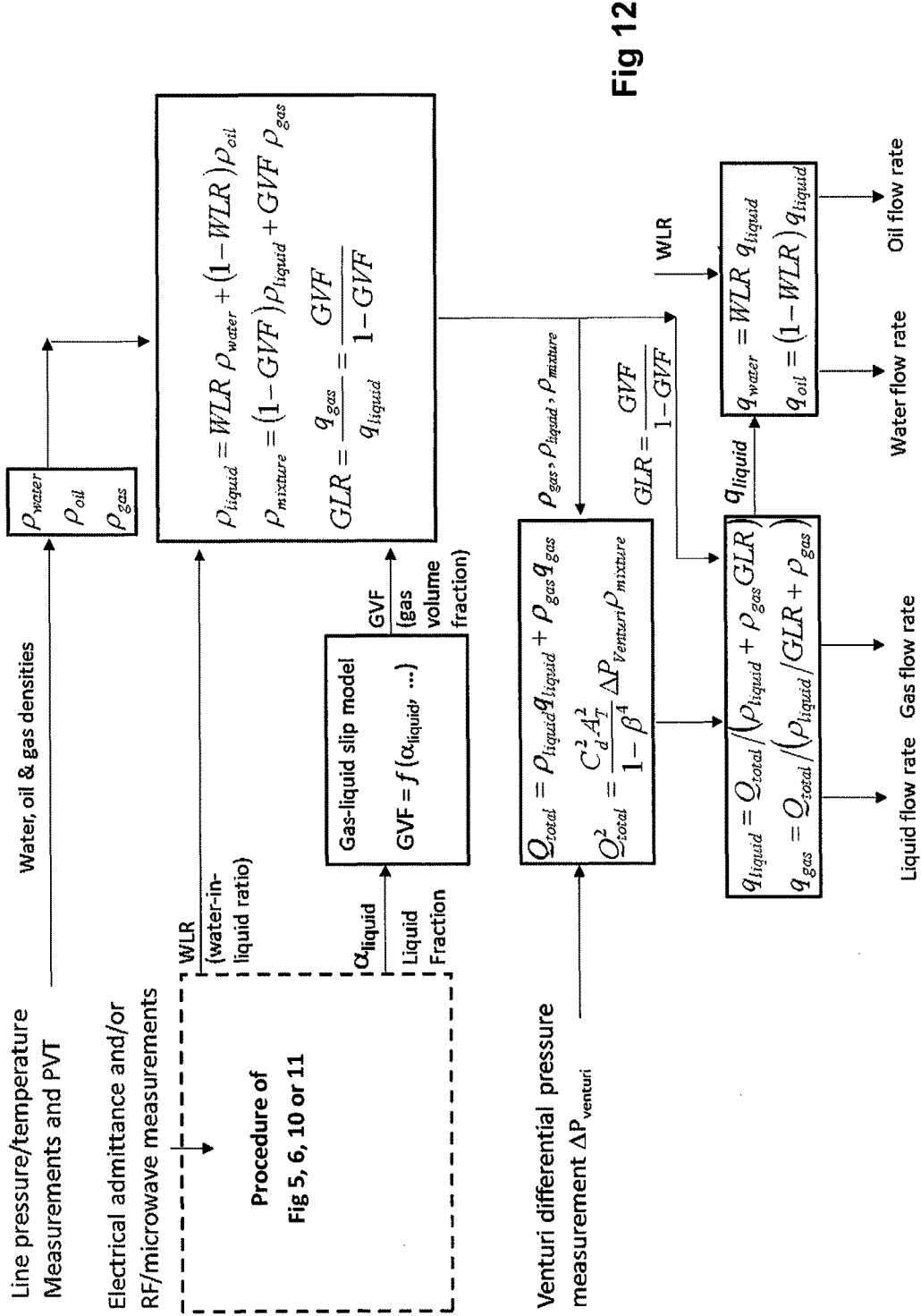
FIG. 12 is flow chart showing example schemes of data processing for deriving gas, oil and water volume flow rates from measured liquid holdup and WLR, and the measured Venturi differential pressure.

Measurements made using the electrode arrangement of FIG. 2 were used to make determinations of water, gas and liquid flow rates by calculation in accordance with FIG. 12. The resulting values were compared with the known flow rates of the phases in the multiphase mixtures used for the measurements. It was found that accuracy was within ±10% up to a high GVF.

The method and apparatus disclosed above can provide a multiphase flowmeter which does not require any gamma ray source, making such a flowmeter desirable for use when, or where, use of a gamma ray source is not desired or not permitted. However, it should also be appreciated that the underlying method of fast electrical impedance and/or RF/microwave measurements of this invention for robust mixture permittivity and/or conductivity, the WLR and liquid-holdup measurements can be used in combination with a gamma-ray or X-ray densitometer, and in combination with a multi-energy gamma-ray or multi-energy X-ray system.

The method and apparatus above may use a plurality of electrodes around a cross section through the flow or alternatively a plurality of microwave antennas. It is possible, within the scope of the invention that electrodes and microwave antennas could both be provided, possibly around a common cross section or around adjacent cross sections.

Fast electrical impedance and/or RF/microwave liquid holdup measured at Venturi throat may be used to reconstruct a fast gamma-ray or X-ray count-rate measurements. In an embodiment of the present invention, this configuration reduces the time-averaging error in determining gas-liquid mixture density due to its nonlinear dependence on the count-rate and/or on the gas-liquid distribution.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

The invention claimed is:

1. A method for measuring properties of a flowing multiphase mixture comprising:
repeatedly measuring an electrical property of the multiphase mixture over a period of time, using a plurality of sensors comprising at least two sensing electrodes or at least two microwave antennas, the sensors being positioned around a same cross section of a conduit through which the multiphase mixture flows;
processing the measurements to determine a plurality of values of permittivity or conductivity of a liquid phase of the multiphase mixture within the period of time;
detecting, using the plurality of values, a portion of the period of time as associated with a liquid slug; and
processing the plurality of values to determine at least one of a water-in-liquid-ratio and a liquid holdup of the multiphase mixture corresponding to the portion.

2. The method of claim 1, wherein the measurements are repeated at a rate of at least 10 per second.

3. The method of claim 1, wherein the measurements are repeated at a rate of at least 20 per second.

4. The method of claim 1, wherein the measurements are repeated at a rate of at least 50 per second.

5. The method of claim 1, wherein the period of time is at least ten seconds.

6. The method of claim 1, comprising detecting peak values in the plurality of values and processing the peak values to determine at least the water-in-liquid-ratio of the multiphase mixture.

7. The method of claim 6, further comprising processing the plurality of values to determine the liquid holdup.

8. The method of claim 1, wherein
repeatedly measuring the electrical property of the multiphase mixture is carried out on at least two different measurement paths through the flowing multiphase mixture, where one measurement path extends through more of a central region and less of an edge region of the flowing mixture than another measurement path,
the processing of the measurements includes determining a plurality of values of permittivity or conductivity for each of the at least two different measurement paths, and
the method comprises processing the values of permittivity or conductivity for each of the at least two measurement paths to determine a plurality of values of liquid holdup or the water-in-liquid-ratio of the multiphase mixture.

9. The method of claim 1, wherein measuring the electrical property is carried out using two or more electrical admittance, impedance, capacitance, conductance, or resistance sensing electrodes.

10. The method of claim 1, wherein measuring the electrical property is carried out using two or more dielectric-sensing RF or microwave antennas.

11. The method of claim 1, wherein the cross-section is a cross-section of a throat of a Venturi.

12. The method of claim 11, wherein the multiphase mixture flows substantially vertically through the Venturi.

13. The method of claim 12, wherein the multiphase mixture is turned through a right-angle bend upstream of the Venturi to promote slug flow of the multiphase mixture.

14. The method according to claim 1, wherein the number of sensors positioned around the same cross section of the conduit is more than two, so as to measure an electrical property along at least two measurement paths through the flow in the conduit.

15. A method for measuring properties of a flowing multiphase mixture, comprising:
repeatedly measuring an electrical property of the multiphase mixture over a period of time, using a plurality of sensors comprising at least two sensing electrodes or at least two microwave antennas, the sensors being positions around a same cross section of a throat of a Venturi through which the multiphase mixture flows substantially vertically;
processing the measurements to determine a plurality of values of permittivity or conductivity of a liquid phase of the multiphase mixture within the period of time;
processing the plurality of values to determine at least one of a water-in-liquid ratio and a liquid holdup of the multiphase mixture from the permittivity of conductivity, the processing including determining a time-averaged liquid holdup of the multiphase mixture;
deriving a gas-volume-fraction from the time-averaged liquid holdup of the multiphase mixture;
measuring a differential pressure of the multiphase mixture flowing in the Venturi relative to pressure upstream of the Venturi;
determining a total flow rate of the multiphase mixture from the Venturi differential and the mixture density determined from the water-in-liquid-ratio, the liquid holdup or the gas-volume-fraction; and
determining a gas flow rate, an oil flow rate and a water flow rate from the total flow rate of the multiphase mixture and from the water-in-liquid-ratio and the gas-volume-fraction.

16. An apparatus for measuring properties of a multiphase flow, comprising:
a conduit operable to pass the multiphase flow;
at least two sensing electrodes or microwave antennas positioned around a same cross section of the conduit and operable to measure an electrical property along at least one measurement path through the flow in the conduit; and a processor configured to determine from a plurality of measurements of the sensing electrodes or microwave antennas over a period of time, a plurality of values of permittivity or conductivity of a liquid phase of the multiphase mixture, detect, using the plurality of values, a portion of the period of time as associated with a liquid slug, and determine, at least one of a water-in-liquid-ratio and a liquid holdup of the multiphase mixture corresponding to the portion.

17. The apparatus according to claim 16, wherein the conduit extends vertically and comprises a throat of a Venturi, and the cross section at which the at least two sensing electrodes or microwave antennas are positioned is within the throat of the Venturi.

18. The apparatus according to claim 17, further comprising a horizontal inlet conduit coupled through a right angle bend to the conduit.

19. The apparatus according to claim 18, further comprising a differential pressure sensor configured to determine a difference in pressure between the throat of the Venturi and the conduit upstream or downstream of the Venturi.

20. The apparatus according to claim 18, further comprising a pressure sensor configured to determine pressure at the throat of the Venturi or pressure in the conduit upstream of the Venturi.

21. The apparatus according to claim 18, further comprising a temperature sensor configured to determine temperature of the multiphase flow in the conduit upstream or downstream of the Venturi.

22. The apparatus according to claim 16, wherein the number of sensing electrodes or microwave antennas positioned around the same cross section of the conduit is more than two, so as to measure an electrical property along at least two measurement paths through the flow in the conduit.

* * * * *